Patented Sept. 28, 1937

2,094,181

UNITED STATES PATENT OFFICE 2,094,181

POWER DRIVEN DUPLICATING MACHINE

Robert F. Morrison, Oak Park, and Merritt G. Stewart, Chicago, Ill., assignors to Ditto, Incorporated, Chicago, Ill., a corporation of West Virginia Application March 9, 1935, Serial No. 10,214

8 Claims. (Cl. 101—132)

This invention relates to duplicating machines and is particularly adapted to be embodied in a duplicating machine of the type wherein master sheets of paper are employed and the copy sheets are moistened with a suitable solvent for the ink or carbon on the master sheet, each copy sheet being brought in turn into contact with the master sheet so that the data on the master sheet will be duplicated on the copy sheet. In practice volatile solvents such for example as alcohol are employed. The solvents may be applied in any suitable manner such for instance by applying it to the copy sheets by means of a wick or other device to which the solvent is fed from a reservoir.

One form of the invention is embodied in a machine of the type described which comprises a duplicating drum having means for clamping master sheets thereto and for discharging them therefrom. (The master sheet clamping means is substantially the same as that shown in the copending application of Robert F. Morrison and Merritt G. Stewart, Serial No. 753,336 for Duplicating machines, filed November 16, 1934.)

The copy sheets are advanced to the duplicating drum, and a platen roller is adapted to press the copy sheets against the master sheets during the duplicating operations. A power drive is provided for rotating the drum, and means is provided whereby the operator may quickly connect the power means to the drum after which the drum will be rotated through a complete rotation and positively stop, with the mechanism all set for a second duplicating operation at the will of the operator. The operator thus has both hands free for feeding the copy sheets to the machine, and the machine is held in the proper adjusted position for receiving the copy sheets until the operator has fed the copy sheet into position.

The improved machine also comprises moistening means which is brought into engagement with the copy sheets by the initiation of the power connecting operation, but before the copy sheets are drawn between the duplicating drum and the platen roller.

Other features and advantages of the invention will become apparent as the following description progresses, reference being had to the accompanying drawings wherein—

Figures 3, 4:
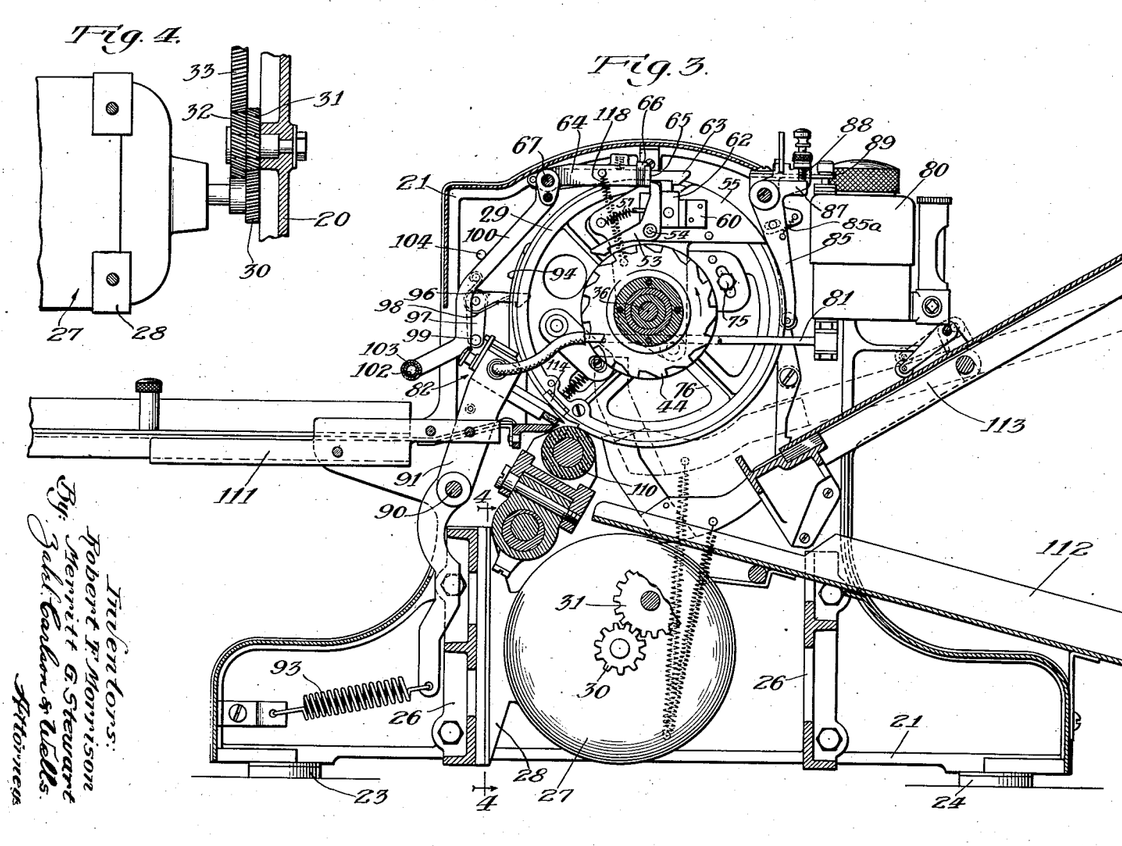
Fig. 3 is a sectional view taken on the line 3—3 of Fig. 2.
Fig. 4 is a fragmentary sectional view on the line 4—4 of Fig. 3.

Referring now to the drawings wherein a preferred embodiment of the invention is shown, the numerals 20 and 21 refer to a pair of side frames on which the mechanism is mounted. These side frames are supported upon suitable cushion feet such as 23 and 24, and the side frames are connected together by cross beams 25 and 26 suitably bolted to the side frames as indicated in Fig. 3.

Figure 1:
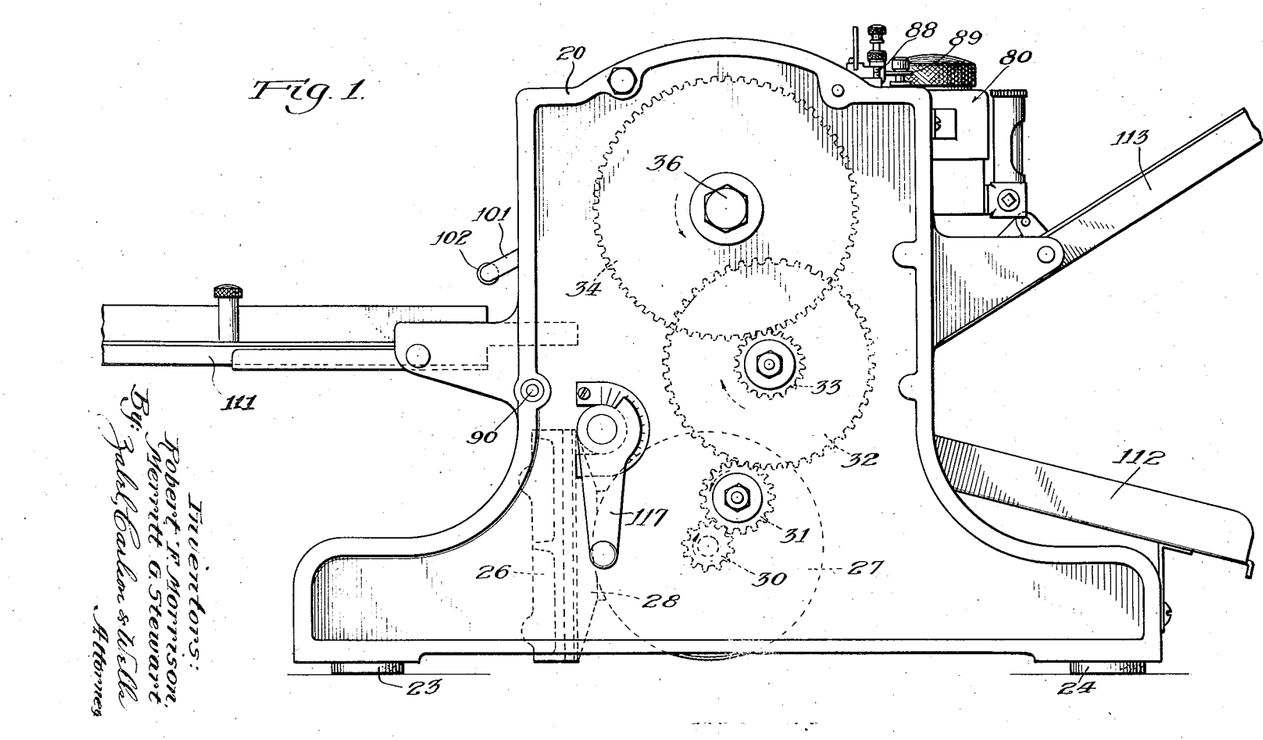
Fig. 1 is a side elevation of a duplicating machine which embodies the invention.

A motor 27 is mounted upon the cross frame 26 by a suitable bracket 28, and this motor is geared to a drum 29 by means of a train of gears shown most clearly in Fig. 1 and consisting of a pinion 30 on the motor shaft and reducing gears 31, 32, 33 and 34. Gears 31, 32 and 33 are mounted on the side frame 20 (see Figs. 1 and 10) by means of suitable stub shafts. The gear 34 is journaled on the axis of the drum 29 in the following manner: A main drum supporting shaft 35 is supported by means of a bolt 36 which projects through the frame 20 and through a sleeve 37 into the end of the shaft 35 where it has a reduced extension 38 screw threading into the shaft. The opposite end of shaft 35 is supported in frame 21 in the same manner. The bolt 36 has a shoulder 39 aligning with the inner end of the sleeve 37 to form an end abutment for the shaft 35. Sleeve 37 has a flange 40 at its inner end, and a washer 41 surrounds the sleeve just inside the frame 20. Between the flange 40 and the washer 41 is a bushing 42 on which a hub 43 for the gear 34 is rotatably mounted.

This hub 43 is reduced in diameter to receive a ratchet wheel 44 which has a limited pivotal movement on the hub as will be presently explained. Pins 45 secure the hub 43 to a ring 46 (see Figs. 6 and 10). This ring 46 is recessed as shown at 47 and 48 to receive rubber inserts 49 and 50, and pins 51 and 52 serve to connect the ratchet wheel 44 with the member 46 through the rubber inserts 49 and 50 thus permitting a substantial amount of yield in the driving connection.

Figures 5, 6:
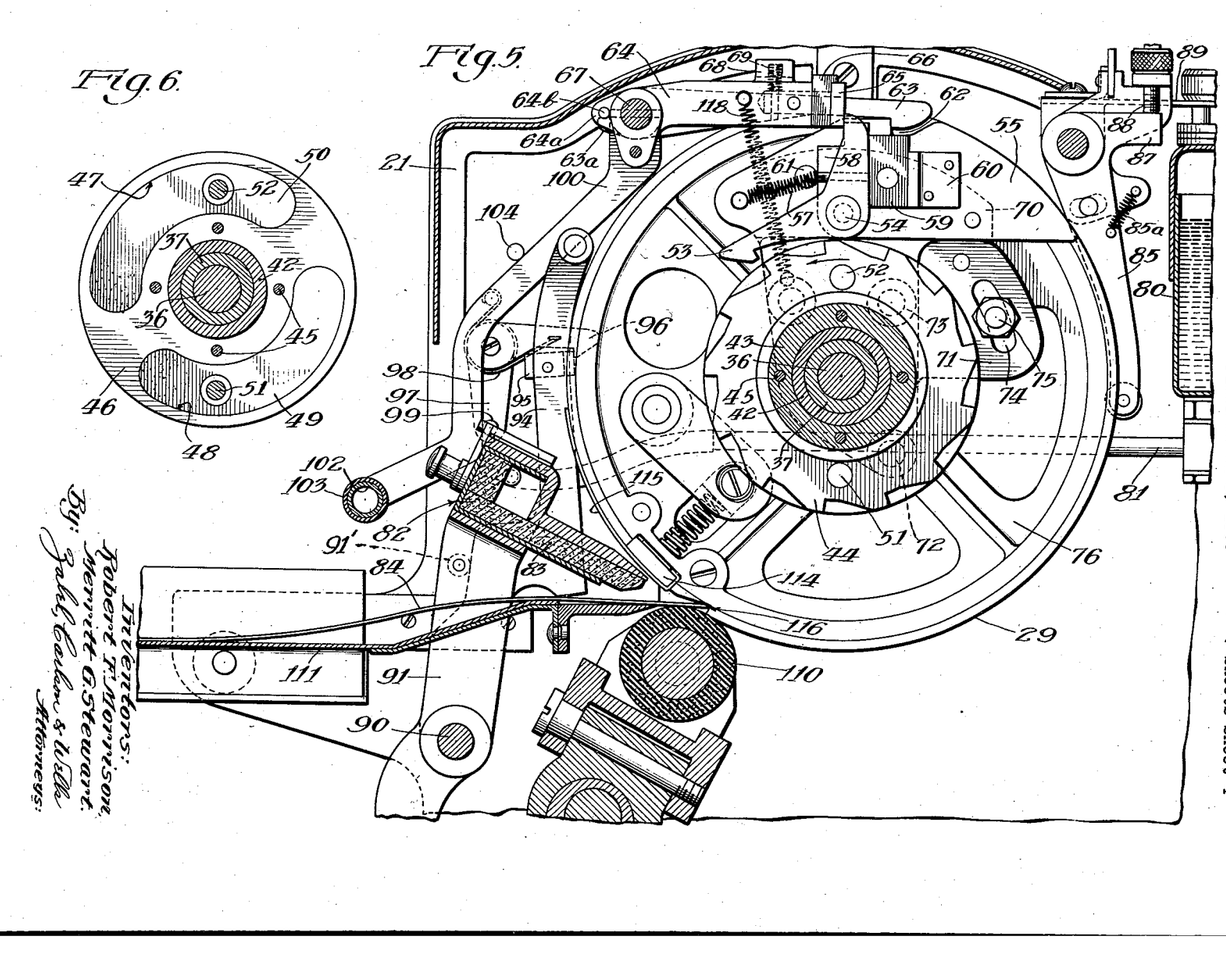
Fig. 5 is an enlarged sectional view taken substantially on the same line as Fig. 3.
Fig. 6 is an enlarged detail view partly in section taken on the line 6—6 of Fig. 10.
Figure 10:
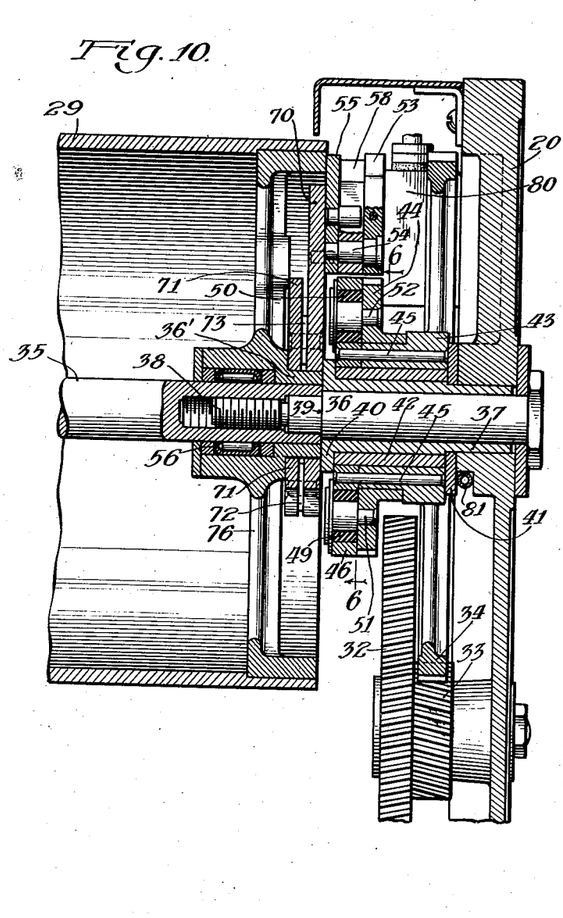
Fig. 10 is an enlarged sectional view on the line 10—10 of Fig. 2.

Referring now to Figs. 5 and 10, the ratchet wheel 44 is engaged by a pawl 53 which is pivoted on a stub shaft 54 which is secured in a plate 55.

Figure 2:
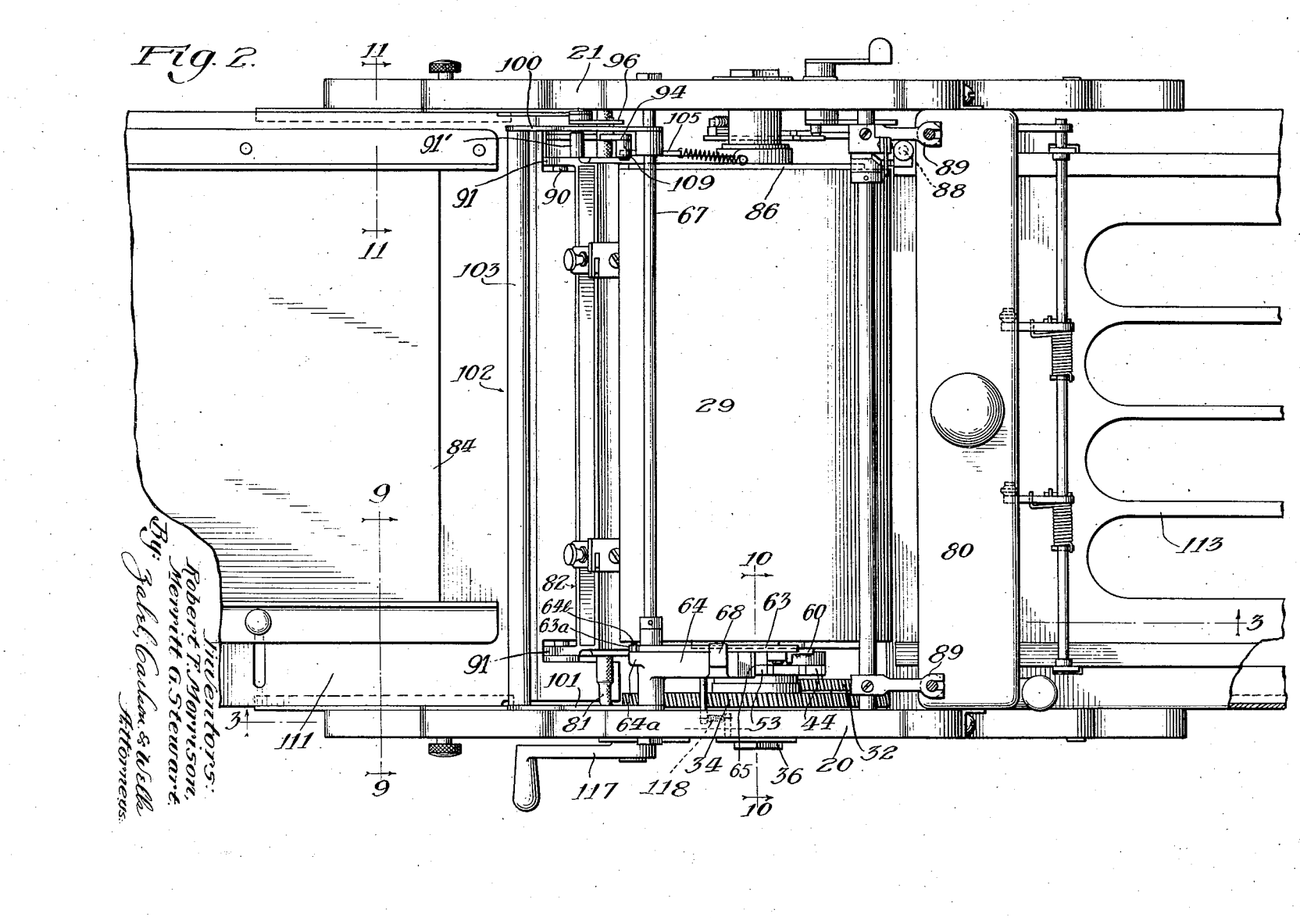
Fig. 2 is a plan view of the machine.
Figures 7, 8:
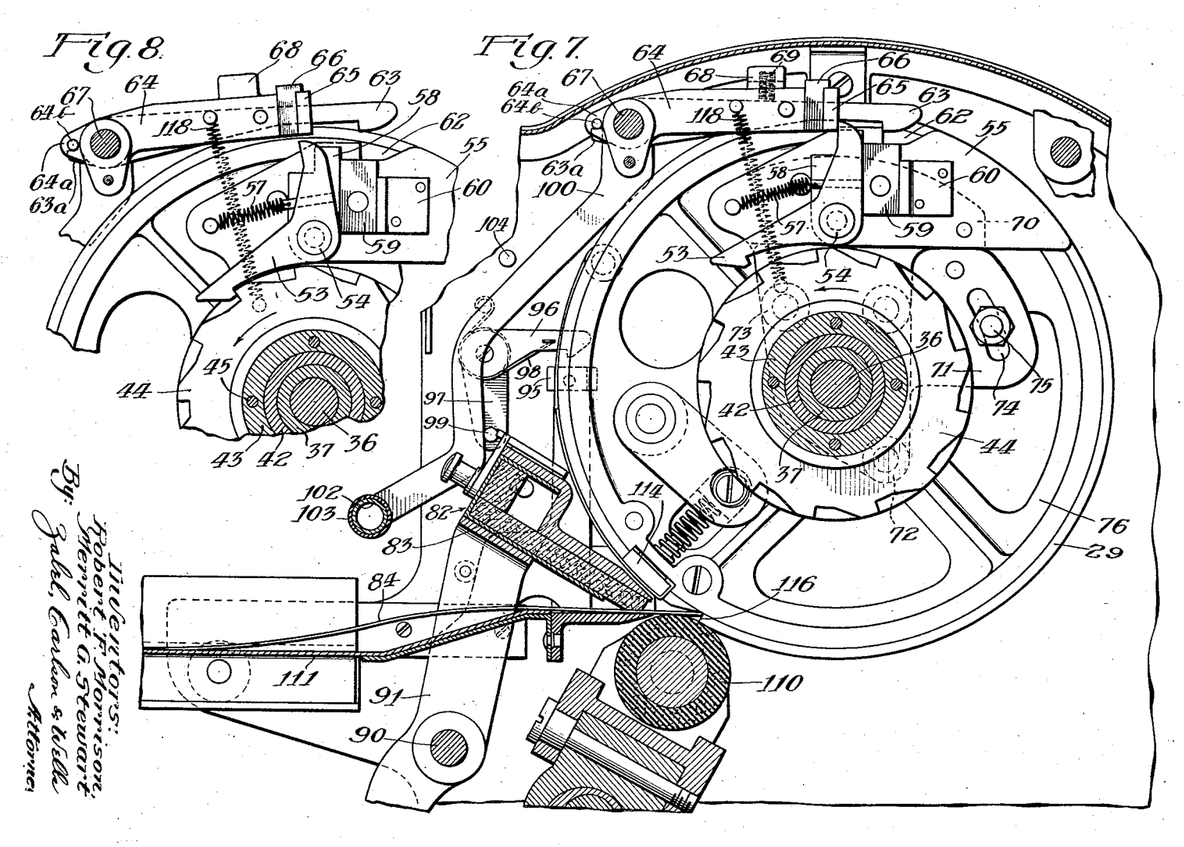
Fig. 7 is a view like Fig. 5 showing the changed position.
Fig. 8 is a fragmentary sectional view of a part of the mechanism shown in Fig. 7.
Figure 9:
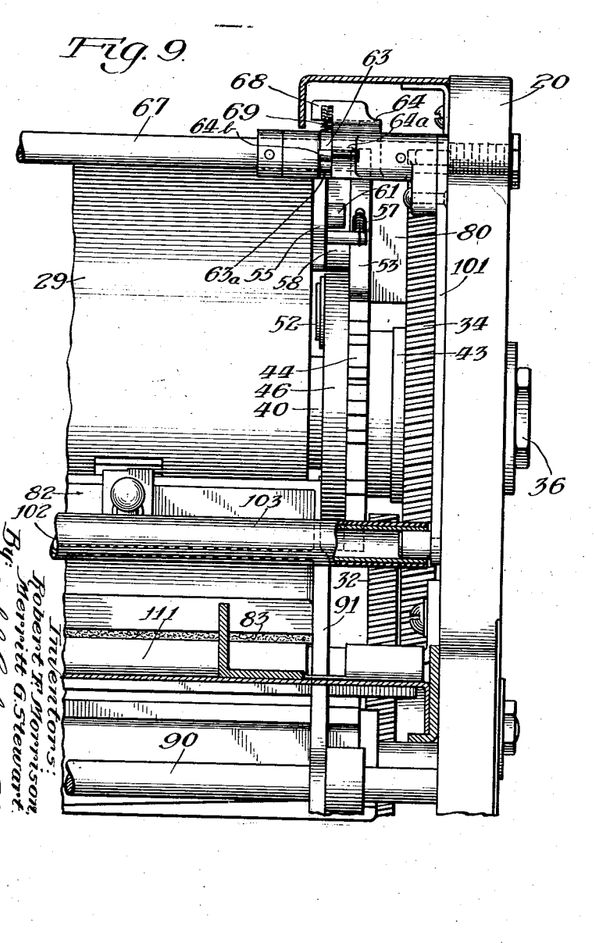
Fig. 9 is an enlarged sectional view taken on the line 9—9 of Fig. 2.

The plate 55 is connected to the drum 29 through a pair of plates 70 and 71 both of which are mounted on a hub 36' of the drum so as to be rotatable thereon, these two plates being fastened together, as illustrated in Fig. 10, by means of the bosses at 72 and 73 and rivets which pass through them. These bosses are shown in dotted lines in Figs. 5 and 7. The plate 71 has a lateral extension which is slotted at 74 (see Fig. 5) to receive a stud 75 which is mounted on an end disk 76 of the drum 29. This provides for angular adjustment of the drum with respect to the plates 70 and 71 and through them with respect to the plate 55 and the pawl 53. The pawl 53 is yieldingly pressed toward the ratchet wheel 44 by means of a spring 57. Also interposed between the pawl 53 and the plate 55 is a yielding stop member 58 which is pivoted on the same stub shaft 54 that carries the pawl 53 and is backed up on one side by a rubber cushion 59 supported by a bracket 60 on the plate 55, while on the other side there is provided a stop pin 61 to hold the member 58 up against the rubber block 59. The plate 55 is notched as indicated at 62 to receive a latch 63 and a trip arm 64 is provided with a yielding abutment 65 for engaging the upper end of the pawl 53 and a shoulder on the member 58. A suitable rubber block 66 acts as a cushion for the abutment 65. The latch 63 is pivoted on a shaft 67 to which the trip arm 64 is pinned, and a lateral extension 68 on the trip arm 64 extends over the latch arm 63 and houses a spring 69 which yieldingly presses the latch arm 63 downwardly. The trip arm 64 has a lug 64a carrying a pin 64b which engages lug 63a on latch 63 to raise latch 63 with trip arm 64. Trip arm 64 is drawn down by a spring 118 connected at one end to trip arm 64 and at the other end to the side frame 20. (See Figs. 2 and 5.)

It is believed to be evident from the description just given that, when the motor is driving the ratchet wheel 44 in a counter-clockwise direction, the pawl 53 can be engaged with the ratchet wheel to cause the plate 55 to turn therewith by merely raising the trip arm 64 out of the path of the upper end of the pawl 53 and the stop member 58. Thus driving connection is established from the ratchet wheel 44 through the pawl 53 and its stub shaft 54, plate 55, and plates 70 and 71 to the drum disk 76 to rotate the drum about the shaft 35. The hub 36' of the drum is mounted on suitable roller bearings 56 on the shaft 35. (See Fig. 10.)

The moistening apparatus comprises a tank 80 containing a supply of moistening fluid, a conduit 81 leading from this tank to a moistening unit 82 which moistening unit has a felt pad 83 through which the fluid is fed to the copy sheets, one of which is indicated at 84 and suitable valve means controlled by an arm 85 operating a suitable valve mechanism, the details of which are not shown here as they form no part of the present invention.

The arm 85 is actuated once for each revolution of the drum by means of a cam 86 which is secured to the opposite end of the drum from the ratchet wheel 44. The details of this fluid feeding mechanism are quite similar in principle to those illustrated in the prior application hereinbefore referred to except that in the present instance the valves are actuated directly from the drum by means of the cam 86 through the arm 85. It will be noted that the arm 85 at its upper end has a lateral projection 87 engaging the lower end of a set screw 88 to vary the angular relation of the arm with respect to a valve operating bar 89 for adjusting the valve opening. A spring 85a holds projection 87 up against the screw 88.

Figure 11:
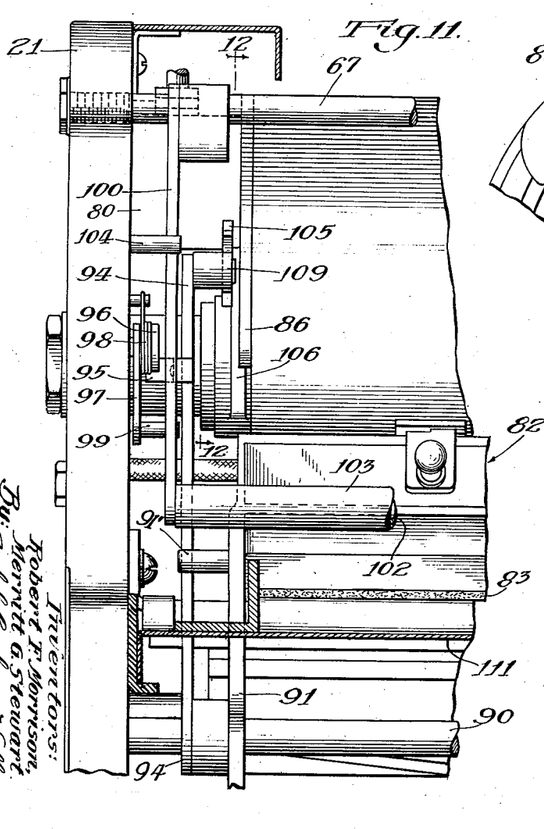
Fig. 11 is an enlarged sectional view on the line 11—11 of Fig. 2.

The moistener 82 is pivoted on a shaft 90, and the lower ends of arms 91 which carry the moistener 82 are drawn out by means of a spring 93 (see Fig. 3) so as to normally move the moistener down to bring the felt strip 83 against the copy sheet. The arm 91, located at the left hand side of the machine (see Fig. 11), has a pin 91' which engages a lever arm 94. This arm 94 is also pivoted on shaft 90 and is provided with a laterally extending stop plate 95 adapted to be engaged by a pawl 96 on a bell crank 97 to hold the moistener in raised position as shown in Fig. 5.

Figure 13:
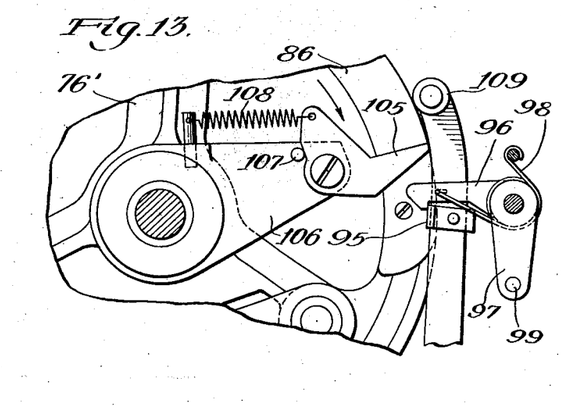
Fig. 13 is a fragmentary view like Fig. 12 illustrating a changed position of the mechanism.

A suitable spring 98 normally urges the bell crank lever 97 into the position shown in Fig. 5 and Fig. 13. The lower end of the bell crank lever 97 has a pin 99 projecting into the path of an arm 100 so that when this arm is moved inward, the bell crank lever is moved to trip the pawl 96 and to allow the moistener to move down against the copy sheet. Arm 100 and an operating arm 101 for operating the trip arm 64 are both carried on the shaft 67, and they are connected at their lower ends by a cross bar 102. This cross bar is shown as a pipe suitably covered with a rubber covering 103.

The two arms are adapted to actuate the bell crank lever 97 and the trip arm 64 in a definite timed relation so that upon the initial movement of the cross bar 102 by the operator, he first trips the pawl 96 to allow the moistener 82 to move down upon the copy sheet which has been fed to the drum before the trip arm 64 has moved up past the upper end of the pawl 53 to start the drum in rotation. This enables the moistener to be placed in position just before the drum starts to advance the copy sheet.

As the drum rotates, it resets the trip mechanism as the end of the latch arm 63 is permitted to move down after the plate 55 has moved out of the way. A stop pin 104 limits this movement by engaging arm 100 of the actuating mechanism composed of the two arms 100 and 101. As the drum continues to rotate, it resets the moistener in raised position by means of a cam 105 (see Figs. 12 and 13) which is mounted on a disk 76' mounted in the end of the drum 29 at the left hand side of the machine. The mounting means for cam 105 consists of a plate 106 fixed to the disk 76' to which the cam 105 is pivoted, a stop member 107 being provided on the plate, and a spring 108 being provided to hold the cam against the stop member 107.

Figure 12:
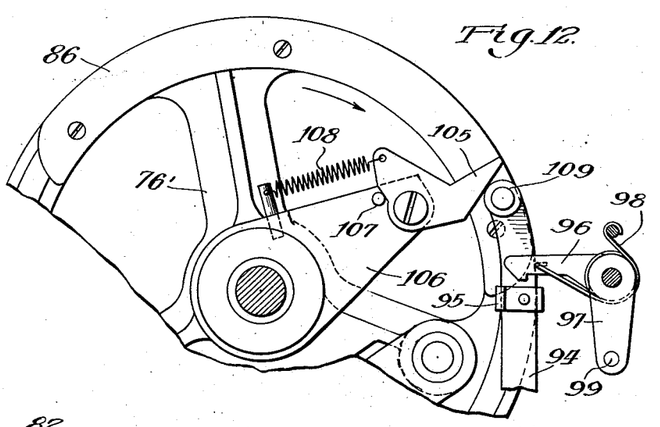
Fig. 12 is a sectional view on the line 12—12 of Fig. 11.

The cam 105 is so positioned on the disk 76 that when the drum is rotating in the usual direction of feed, indicated by the arrow in Fig. 12, the cam 105 strikes a roller 109 on the end of arm 94 after the copy sheet has passed beneath the moistener. Cam 105 then moves the arm 94 out to permit pawl 96 to hook over stop plate 95 and latch the arm 94 in position to hold the moistener raised as shown in Fig. 5. If the drum should be rotated in a reverse direction, that is, counterclockwise as shown in Fig. 12, then cam 105 would swing against the pull of spring 108 out of the way of roller 109.

The machine is shown as provided with the usual platen roller 110, a copy sheet feeding table 111, a delivery table 112, and a master sheet feeding table 113. These devices, however, need not be further described as the specific details thereof are not of importance to the present invention. The master sheet gripping mechanism is indicated at 114 in Fig. 5 where a master sheet 115 is shown as gripped thereby.

The operation of the device through one complete cycle will now be traced. We will assume that a master sheet 115 has been applied to the drum and that the drum is properly set in position so that the margin notch at 116 is at the desired point. Also, we will assume that the platen roller has been properly adjusted by means of an arm 117 (see Fig. 10) and that the operator has positioned a copy sheet in the position shown in Fig. 5. The drum is locked against rotation in either direction by the abutment 65 engaging the stop member 58 and the upper end of the pawl 53 while the latch arm 63 is engaged in the notch 62 in the plate 55. Now the operator wishes to make a copy so he simply strikes the bar 102 or moves it down.

The first response to the operator's action is the engagement of arm 100 with pin 99 on bell crank lever 97. This releases the pawl 96 allowing the spring 93 to swing the arm 91 and the moistener about the shaft 90 to bring the moistening strip 83 down against the copy sheet. The movement of the bar 102 causes arm 101 to raise trip arm 64 up to bring the abutment 65 first above the top of the stop member 58 to release the drum for rotation (see the position shown in Fig. 7), and then finally to bring the abutment 65 out of the way of the upper end of the pawl 53. Pawl 53 under the influence of the spring 57, moves down into engagement with the teeth of the ratchet wheel 44 (see Fig. 8).

The drum starts to rotate, but not with a sudden motion owing to the fact that it is cushioned in the connection of the ratchet wheel 44 with the hub of the gear 34 through the rubber cushions 49 and 50. The drum then rotates by means of the power applied by the motor through the train of gears, and, after the plate 55 is moved out of the way, the trip arm 64 and the latching lever 63 are pulled down by the spring 118, to bring them back to stop position and to bring the arm 100 up against the stop 104. Near the end of the drum revolution, the resetting cam 105 engages the roller 109 on the arm 94 and moves this arm outward which again raises the moistener. The pawl 96 hooks over plate 95 to hold the moistener in raised position. The plate 55 raises the arm 63 as the drum returns to its original position, but the spring 118 which is stronger than spring 69 holds the trip arm 64 down in the path of the pawl 53 so that the abutment 65 engages with the pawl and releases the pawl just before the stop member 58 comes into contact with the abutment 65. The latching lever 63 drops into the notch 62 and the drum is locked in position. The rubber cushions 59 and 66 prevent any excessive strain on the drum and other mechanism in stopping.

The cycle of operations being completed, the drum is now locked in stationary position, the moistener is raised, and the machine is ready for feeding a new copy sheet into position after which the operator can repeat the cycle of operations by depressing the bar 102.

While certain embodiments of the invention have been shown and described, it is to be understood that it is capable of many modifications. Changes, therefore, in the construction and arrangement may be made without departing from the spirit and scope of the invention as disclosed in the appended claims, in which it is the intention to claim all novelty inherent in the invention as broadly as possible, in view of the prior art.

We claim:

1. In a duplicating machine, a rotatable duplicating drum, means for holding a master sheet on said drum, means for applying a copy sheet and a moistening fluid to said master sheet, power driven means for rotating said drum, and control mechanism operable to connect said drum to said power driven means and having means to stop said drum after a duplicating cycle in position to begin a new duplicating cycle, said control mechanism comprising pawl and ratchet means to connect said power driven means to said drum, and manually operable trip members controlling said pawl and ratchet means together with means movable with the drum and engaging with said members to lock said drum against forward or rearward rotation after each cycle.

2. In a duplicating machine, a frame, a duplicating drum rotatably mounted thereon, a power driven member rotatably mounted on said frame, locking means locking said drum in one definite position while it is at rest, means for connecting said drum to said power driven member to rotate the drum, said connecting means being controlled by said locking means, and manually operable means for causing said locking means to release the drum for rotation and to actuate said connecting means.

3. In a duplicating machine, a frame, a duplicating drum rotatably mounted thereon, a power driven member rotatably mounted on said frame, locking means locking said drum in one definite position while it is at rest, means for connecting said drum to said power driven member to rotate the drum, said connecting means being controlled by said locking means, and manually operable means for causing said locking means to release the drum for rotation and to actuate said connecting means, said locking means being operable to release the drum from said power driven member and stop the drum in the original position at the end of a complete rotation.

4. In a duplicating machine, a frame, a duplicating drum rotatably mounted thereon, a power driven member rotatably mounted on said frame, holding means positioning said drum in one definite position while it is at rest, means for connecting said drum to said power driven member to rotate the drum, said connecting means being controlled by said holding means, and manually operable means for causing said locking means to release the drum for rotation and to actuate said connecting means, said power driven member having a yielding mounting to absorb the shock of its connection to the drum, said connecting means comprising a pawl pivotally mounted on the drum, and said power driven member having ratchet teeth for engaging said pawl.

5. In a duplicating machine, a frame, a duplicating drum rotatably mounted thereon, a power driven member rotatably mounted on said frame, a copy sheet table, moistening means for moistening sheets fed from the table to said drum, locking means for locking said drum in one definite position while it is at rest, means operable by said locking means to connect said power driven means to said drum to rotate the drum when the locking means releases the drum, and manual control mechanism for said locking means comprising a cross bar over said copy sheet table, and a lever pivoted on the frame and secured to said cross bar, said locking means being operatively connected to said lever.

6. In a duplicating machine comprising a frame, a duplicating drum rotatably mounted thereon and having master sheet clamping means, a copy sheet table adjacent to said drum, and moistening means for moistening copy sheets before applying them to a master sheet on said drum, manually controlled means to intermittently rotate the drum from a continuously driven member, said manually controlled means comprising a spring pressed pawl on the drum adapted to engage said driven member, a stop member on the drum, a latch lever engaging shoulder on said drum adjacent said stop member, a trip lever pivoted on the frame and movable into the path of said pawl and stop member to first release the pawl and then stop the drum, a latching lever pivoted with the trip lever and having a lost motion connection with the first named lever, and a cross bar over said table and operatively connected to said trip lever.

7. In a duplicating machine comprising a frame, a duplicating drum rotatably mounted thereon and having master sheet clamping means, a copy sheet table adjacent to said drum, and moistening means for moistening copy sheets before applying them to a master sheet on said drum, manually controlled means to intermittently rotate the drum from a continuously driven member, said manually controlled means comprising a spring pressed pawl on the drum adapted to engage said driven member, a stop member on the drum, a latch lever engaging shoulder on said drum adjacent said stop member, a trip lever pivoted on the frame and movable into the path of said pawl and stop member to first release the pawl and then stop the drum, a latching lever pivoted with the trip lever and having a lost motion connection with the first named lever, and a cross bar over said table and operatively connected to said trip lever, said latch lever and said trip lever being pivoted on a common axis, said trip lever having a portion projecting over the latch lever and a spring interposed between said portion and the latch lever.

8. In a duplicating machine comprising a frame, a duplicating drum rotatably mounted thereon and having master sheet clamping means, a copy sheet table adjacent to said drum, and moistening means for moistening copy sheets before applying them to a master sheet on said drum, manually controlled means to intermittently rotate the drum from a continuously driven member, said manually controlled means comprising mechanism for connecting the drum to the driven member whereby to rotate said drum, a pair of control members having means operable to secure said drum against rotation in either direction, one of said control members including means to release the connecting mechanism between the drum and the driven member.

MERRITT G. STEWART.
ROBERT F. MORRISON.